(12) United States Patent
Hiruta

(10) Patent No.: US 7,778,502 B2
(45) Date of Patent: Aug. 17, 2010

(54) OPTICAL TRANSMISSION ASSEMBLY

(75) Inventor: Akihiro Hiruta, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 37 days.

(21) Appl. No.: 12/153,251

(22) Filed: May 15, 2008

(65) Prior Publication Data
US 2009/0169216 A1 Jul. 2, 2009

(30) Foreign Application Priority Data
Dec. 28, 2007 (JP) .............................. 2007-340394

(51) Int. Cl.
G02B 6/12 (2006.01)
H04B 10/12 (2006.01)
H04B 10/04 (2006.01)

(52) U.S. Cl. .................... 385/14; 398/141; 398/142; 398/201

(58) Field of Classification Search .................. 385/14, 385/141, 142, 201
See application file for complete search history.

(56) References Cited

U.S. PATENT DOCUMENTS 5,400,419 A * 3/1995 Heinen .................... 385/14

2003/0123819 A1 * 7/2003 Nakanishi et al. ............. 385/92

FOREIGN PATENT DOCUMENTS

| JP | 2003-139979 | | 5/2003 |
|---|---|---|---|
| JP | 2005-91460 | | 4/2005 |
| JP | 2005-091460 | * | 4/2005 |
| JP | 2005-331702 | | 12/2005 |

* cited by examiner

Primary Examiner—Uyen-Chau N Le
Assistant Examiner—Kajli Prince
(74) Attorney, Agent, or Firm—McGinn IP Law Group, PLLC

(57) ABSTRACT

An optical transmission assembly consists of an upper cladding; a lower cladding; a core formed between the upper cladding and the lower cladding; a surface light emitting device mounted to an upper surface at one end of the upper cladding, a light emitting surface of the surface light emitting device facing the core and emitting wavelength $\lambda 1$ light thereto; a reflective surface formed in the core and at a position facing the light emitting surface of the surface light emitting device, and inclined in a longitudinal direction of the core; an inclined surface formed in the core and facing the reflective surface in a longitudinal direction of the core, and inclined in a thickness direction of the upper or lower cladding; a wavelength filter formed on the inclined surface and transmitting wavelength $\lambda 1$ light incident in a longitudinal direction of the core while reflecting wavelength $\lambda 2$ ($\lambda 2 \neq \lambda 1$) light incident in the opposite longitudinal direction of the core to the incident direction of the wavelength $\lambda 1$ light, in a thickness direction of the lower cladding; and a light receiving device mounted on a lower surface of the lower cladding and facing the wavelength filter.

4 Claims, 3 Drawing Sheets

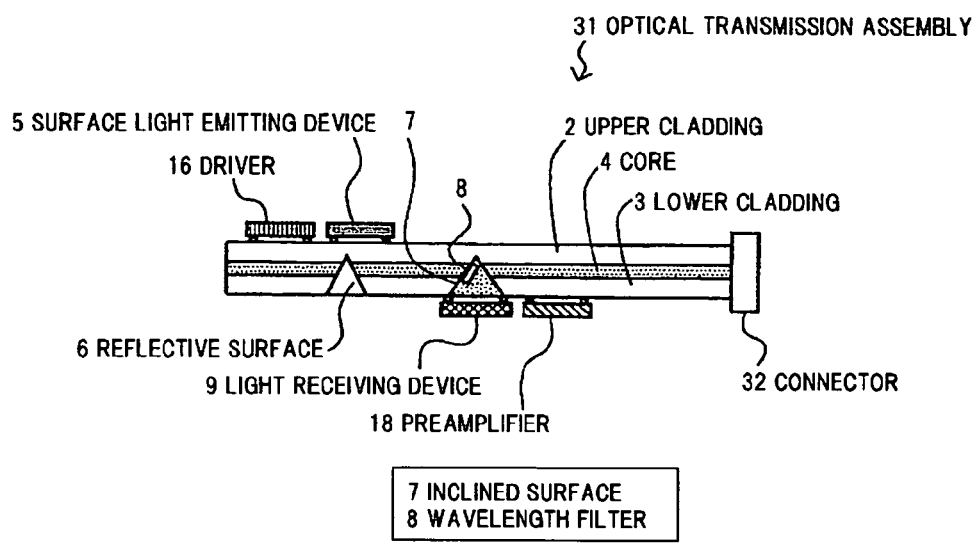
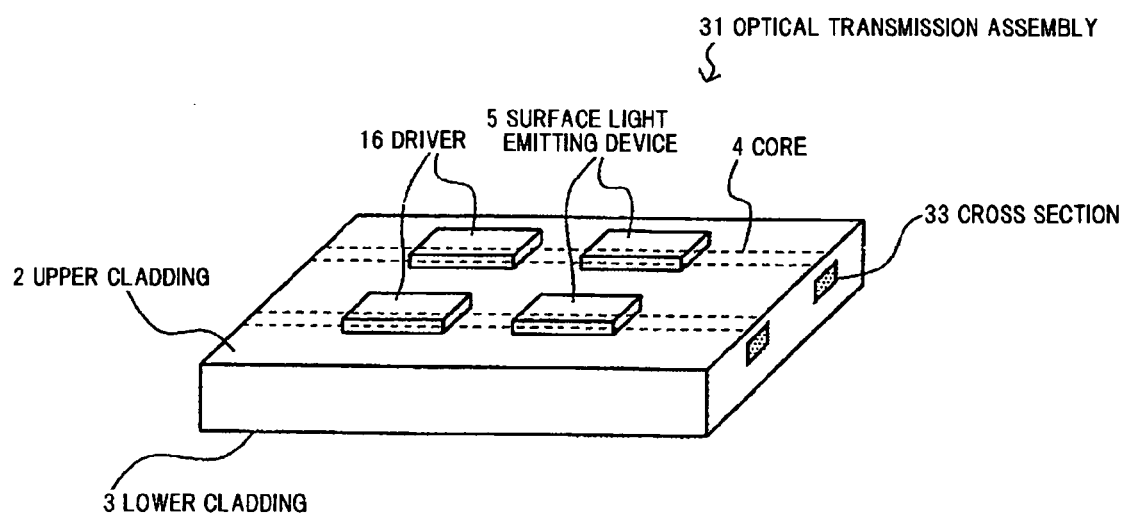

Related Art

OPTICAL TRANSMISSION ASSEMBLY

The present application is based on Japanese patent application No. 2007-340394 filed on Dec. 28, 2007, the entire contents of which are incorporated herein by reference.

BACKGROUND OF THE INVENTION

1. Field of the Invention

The present invention relates to an optical transmission assembly which reduces electromagnetic noise between transmission and reception.

2. Description of the Related Art

Optical signals may be transmitted/received in a longitudinal direction of a core by surface-mounting a light emitting device or a light receiving device on an optical circuit substrate with the core formed between claddings, forming reflective surface partially in the core, and optically coupling the light emitting or receiving device and the optical axis of the core.

A conventional optical transmission assembly of this kind is designed to combine a transmitted light signal and a received light signal, and transmit to a common core extending to an input/output port. For example, optical transmission assembly 51 shown in FIGS. 5 and 6 comprises a light emitting device 53 and a light receiving device 54 mounted on the upper surface of a cladding 52, and a core 55 formed in the cladding 52 that is passed below each of the light emitting device 53 and the light receiving device 54. A reflective surface 56 is formed by forming, e.g., dicing an inverted V-shape groove that extends from the lower surface of the cladding 52 to the core 55, the inclined surface of the groove via which the core 55 and a material (herein, air) with a refractive index smaller than that of the core 55, being in contact with each other.

The light emitting device 53 side core 55 and the light receiving device 54 side core 55 intersect at a specified angle in top view. At that crossing point, a square groove 57 extending from the upper surface of the cladding 52 to the core 55 is diced by being intersected at a specified angle to the core 55 in top view. A wavelength filter 58 is inserted in the square groove 57. The transmitted light signal and received light signal may be combined (separated) according to angles made by each core 55 and wavelength filter 58. An optical transmission assembly on the other side not shown has the same structure, except that only the mode of wavelength filter 58 is different in both the optical transmission assemblies.

For example, in the optical transmission assembly 51 on one side shown, to transmit wavelength 1.5 μm light and receive wavelength 1.3 μm light, the wavelength filter 58 is installed that reflects the wavelength 1.3 μm light and transmit wavelength 1.5 μm light, while in the optical transmission assembly on the other side not shown, to transmit wavelength 1.3 μm light and receive wavelength 1.5 μm light, the wavelength filter 58 is installed that reflects the wavelength 1.5 μm light and transmit wavelength 1.3 μm light.

In the optical transmission assemblies on both sides, this allows the light signal transmitted from one optical transmission assembly to be transmitted through its own wavelength filter 58 to the other optical transmission assembly, while allowing the light signal transmitted from the other optical transmission assembly to be reflected and divided at its own wavelength filter, and received. In this manner, bidirectional transmission/reception is possible at the common input/output port (See, JP-A-2005-91460, JP-A-2003-139979).

In the optical transmission assembly 51 of FIG. 5, the light emitting device 53 and the light receiving device 54 are both mounted on the upper surface of the cladding 52. The driver 60, which drives the light emitting device 53, and the preamplifier 59, which amplifies received light signals of the light receiving device 54, are also mounted on the upper surface of the cladding.

The driving current for the light emitting device 53 is on the order of a few tens of mA, while the received light signals of the light receiving device 54 are on the order of a few μA, which is small by the order of 3 digits compared to the driving current. For this reason, electromagnetic noise from the driver 60 adversely affects operation of the preamplifier 59. Namely, amplifying a faint received signal with a few hundred-fold to a few tens-of-thousand fold gain in the preamplifier 59 likewise causes amplification of electromagnetic noise components, resulting in deterioration in signal-to-noise ratio.

The simplest method to avoid electromagnetic noise is to make large the distance between the driver and the preamplifier. However, in order for the optical transmission assembly to be small-sized and integrated, it is desirable to avoid making large the distance between the light emitting device and the light receiving device.

SUMMARY OF THE INVENTION

Accordingly, it is an object of the present invention to provide an optical transmission assembly, which obviates the above problems, and which reduces electromagnetic noise between transmission and reception.

(1) According to one embodiment of the invention, an optical transmission assembly comprises:

an upper cladding;

a lower cladding;

a core formed between the upper cladding and the lower cladding;

a surface light emitting device mounted on an upper surface at one end of the upper cladding, a light emitting surface of the surface light emitting device facing the core and emitting wavelength $\lambda 1$ light thereto;

a reflective surface formed in the core and at a position facing the light emitting surface of the surface light emitting device, and inclined in a longitudinal direction of the core;

an inclined surface formed in the core and facing the reflective surface in a longitudinal direction of the core, and inclined in a thickness direction of the upper or lower cladding;

a wavelength filter formed on the inclined surface and transmitting wavelength $\lambda 1$ light incident in a longitudinal direction of the core while reflecting wavelength $\lambda 2$ ($\lambda 2 \neq \lambda 1$) light incident in the opposite longitudinal direction of the core to the incident direction of the wavelength $\lambda 1$ light, in a thickness direction of the lower cladding; and a light receiving device mounted on a lower surface of the lower cladding and facing the wavelength filter.

In the above embodiment (1), the following modifications and changes can be made.

(i) The optical transmission assembly further comprises:

an opposing light receiving device mounted on an upper surface at the other end of the upper cladding in a longitudinal direction of the core;

an opposing reflective surface formed in the core and at a position facing the opposing light receiving device, and inclined in a longitudinal direction of the core;

an opposing inclined surface formed in the core and facing the opposing reflective surface in a longitudinal direction of the core, and inclined in a thickness direction of the upper or lower cladding;

an opposing wavelength filter formed on the opposing inclined surface and transmitting wavelength λ1 light incident in a longitudinal direction of the core while reflecting wavelength λ2 light incident in a thickness direction of the lower cladding, in a longitudinal direction of the core; and an opposing surface light emitting device mounted on a lower surface of the lower cladding, a light emitting surface of the opposing surface light emitting device facing the opposing wavelength filter.

(ii) The optical transmission assembly further comprises:
electrical wiring formed on either or both of an upper surface of the upper cladding and a lower surface of the lower cladding.

(iii) The optical transmission assembly further comprises:
a connector attached to the other end in a longitudinal direction of the core, the connector engaged with another optical transmission assembly connector or tape optical fiber connector.

BRIEF DESCRIPTION OF THE DRAWINGS

The preferred embodiments according to the invention will be explained below referring to the drawings, wherein:

FIG. 3 is a cross-sectional view illustrating an optical transmission assembly in another embodiment according to the invention;

FIG. 4 is a perspective view illustrating the optical transmission assembly of FIG. 3;

DETAILED DESCRIPTION OF THE PREFERRED EMBODIMENTS

Figure 1:
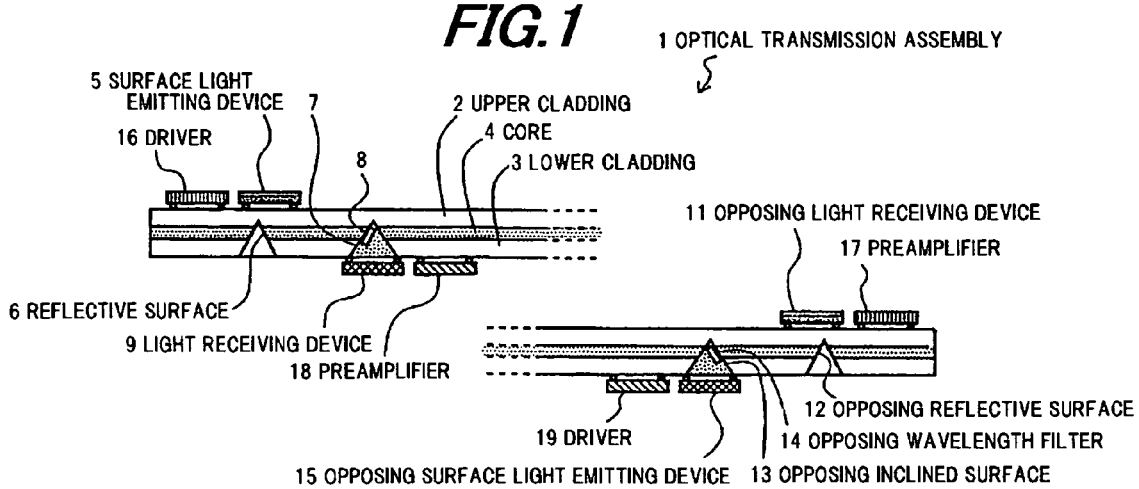
FIG. 1 is a cross-sectional view illustrating an optical transmission assembly in one embodiment according to the invention.

As shown in FIG. 1, an optical transmission assembly 1 according to the invention comprises a core 4 formed between upper cladding 2 and lower cladding 3, and a surface light emitting device 5 mounted on the upper surface at one end (leftward in FIG. 1) of the upper cladding 2 and having its light emitting surface facing the core 4 for emitting wavelength λ1 light. A reflective surface 6 is formed at a position facing the light emitting surface of the surface light emitting device 5, and is inclined in a longitudinal direction of the core, while an inclined surface 7 is formed in the core 4 at a right position in a longitudinal direction of the core relative to the reflective surface 6, and is inclined in a thickness direction of the upper or lower cladding. The inclined surface 7 is provided with a wavelength filter 8 that transmits wavelength λ1 light emitted from its left side in the longitudinal direction of the core while reflecting wavelength λ2 (λ2≠λ1) light incident from its right side in the longitudinal direction of the core, in the thickness direction of the lower cladding 3. The lower surface of the lower cladding 3 is mounted with a light receiving device 9 that faces the wavelength filter 8.

The surface light emitting device 5 is, e.g., a laser diode (LD), and the light receiving device 9 is, e.g., a photodiode (PD).

In this embodiment, the device is mounted at the other (rightward in FIG. 1) end of the optical transmission assembly 1, which constitutes a transmit/receive pair with the device at one end. Namely, the opposing light receiving device 11 is mounted on the upper surface at the other end of the upper cladding 2 in the longitudinal direction of the core, and the opposing reflective surface 12 is formed at a position facing the opposing light receiving device 11 in the core 4, and is inclined in the longitudinal direction of the core, and the opposing inclined surface 13 is formed in the core 4 at a left position in a longitudinal direction of the core relative to the opposing reflective surface 12 in the core 4, and is inclined in a thickness direction of the lower cladding. The opposing inclined surface 13 is provided with the opposing wavelength filter 14 that transmits wavelength λ1 light incident from its left side in the longitudinal direction of the core while reflecting wavelength λ2 light emitted from the opposing surface light emitting device 15 and incident in a thickness direction of the lower cladding, to a left side in the longitudinal direction of the core. The lower surface of the lower cladding 3 is mounted with the opposing surface light emitting device 15 that has its light emitting surface facing the opposing wavelength filter 14.

In the optical transmission assembly 1 of this invention, wavelength λ1 light signals are exchanged between the surface light emitting device 5 mounted on the upper surface at one end of the upper cladding 2 and the opposing light receiving device 11 mounted on the upper surface at the other end of the upper cladding 2 via the core 4, while wavelength λ2 light signals are exchanged between the light receiving device 9 mounted to the lower surface at one end of the lower cladding 3 and the opposing surface light emitting device 15 mounted to the lower surface at the other end of the lower cladding 3 via the core 4. In this manner, the optical transmission assembly 1 of this invention bidirectionally transmits wavelength λ1 and λ2 light transmission signals, via the optical transmission line comprising the core 4. As one example, the wavelength λ1 is 820 nm, while the wavelength λ2 is 850 nm.

The reflective surface 6 is disposed directly below the surface light emitting device 5, and inclined at substantially 45 degrees to the optical axis of the core 4 so as to reflect wavelength λ1 light signals emitted from the light emitting surface of the surface light emitting device 5, in the other end direction of the core 4. Also, the opposing inclined surface 12 is disposed directly below the opposing light receiving device 11, and inclined at substantially 45 degrees to the optical axis of the core 4 so as to reflect wavelength λ1 light signals incident from the one end direction of the core 4, to the opposing light receiving device 11. These reflective surfaces 6 and 12 are formed by providing an inverted V-shape groove that extends from the lower surface of the lower cladding 3 to the boundary between the core 4 and the upper cladding 2. The reflective surfaces 6 and 12 are constructed by the inclined surface of the groove via which the core 4 and a material (herein, air) with a refractive index smaller than that of the core 4, are in contact with each other.

The inclined surface 7 is disposed directly above the light receiving device 9, and holds the wavelength filter 8 at a specified angle (substantially 45 degrees) to the optical axis of the core 4. Likewise, the opposing inclined surface 13 is disposed directly above the opposing surface light emitting device 15, and holds the opposing wavelength filter 14 at a specified angle (substantially 45 degrees) to the optical axis of the core 4. These inclined surfaces 7 and 13 are formed by, as in FIG. 1, providing an inverted V-shape groove that extends from the lower surface of the lower cladding 3 to the boundary between the core 4 and the upper cladding 2, for inclination in the thickness direction of the lower cladding, or by providing a V-shape groove that extends from the upper surface of the upper cladding 2 to the boundary between the core 4 and the lower cladding 3, for inclination in the thickness direction of the upper cladding.

The inverted V-shape groove or the V-shape groove that forms the inclined surface 7 or 13 is filled with a filler made of a resin with substantially the same refractive index as the core 4.

Figure 2:
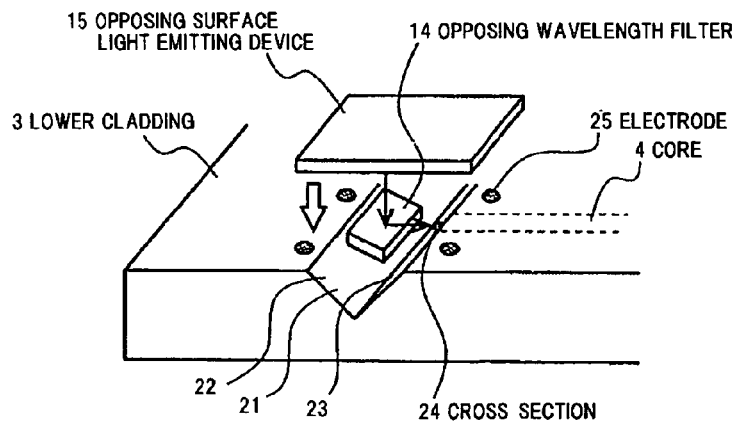
FIG. 2 is a partially enlarged perspective view for explaining a wavelength filter mounting method for the optical transmission assembly of FIG. 1.
Figure 5:
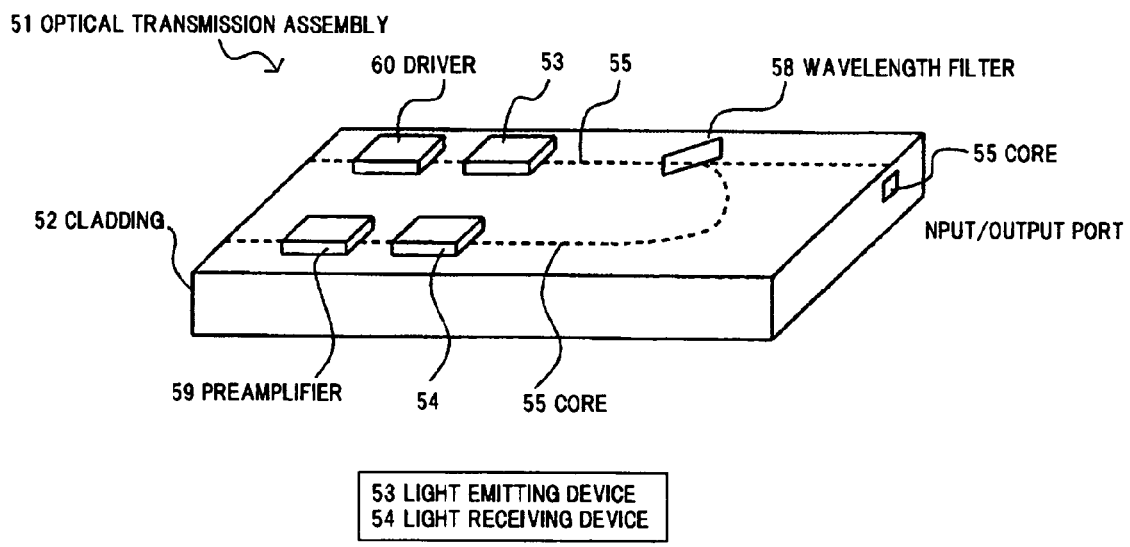
FIG. 5 is a perspective view illustrating a conventional optical transmission assembly.
Figure 6:
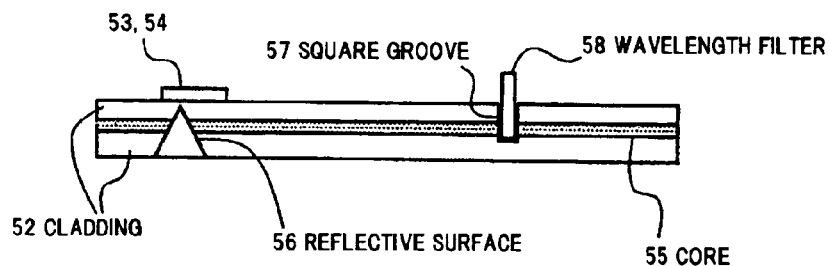
FIG. 6 is a cross-sectional illustrating the conventional optical transmission assembly.

Here, referring to FIG. 2, the structure around the wavelength filter is explained. FIG. 2 is an inverted enlarged perspective view showing the surface light emitting device 15 and portion therearound of the optical transmission assembly 1 of FIG. 1. When inverted V-shape groove 21 in the lower surface of the lower cladding 3 is formed, cross-section 24 of the core 4 is produced in inclined surfaces 22 and 23 on both sides. The opposing wavelength filter 14 is attached to the inclined surface 22 facing the light emitting surface of the surface light emitting device 15. The lower surface of the lower cladding 3 is provided with electrodes 25 with which the surface light emitting device 15 is solder-fixed, and which cause electrical conduction in electrical wiring. As shown, wavelength $\lambda 2$ light emitted from the surface light emitting device 15 is reflected at the opposing wavelength filter 14 and allowed to be incident on the cross-section 24 of the core 4. As analogized from FIG. 2, providing a V-shape groove in the upper surface of the upper cladding 2 to form an inclined surface allows light emitted from the surface light emitting device mounted on the upper surface of the upper cladding 2 to be reflected into the core.

As shown in FIG. 1, the upper surface at one end of the upper cladding 2 is mounted with the driver 16 adjacent to the surface light emitting device 5 that applies driving current to the surface light emitting device 5. The numbers of surface light emitting devices 5 and drivers 16 are each not limited to one, but may be two or more. The upper surface at the other end of the upper cladding 2 is mounted with the preamplifier 17 adjacent to the opposing light receiving device 11 that amplifies received light current of the opposing light receiving device 11. The numbers of opposing light receiving devices 11 and preamplifiers 17 are each not limited to one, but are matched to the number of surface light emitting devices 5.

Plural surface light emitting devices 5 and opposing light receiving devices 11 may be plural LDs and PDs formed in an array and mounted, and cores, the number of which is the same as the number of LDs or PDs, may be formed in an array.

The lower surface at one end of the lower cladding 3 is mounted with the preamplifier 18 adjacent to the light receiving device 9 that amplifies received light current of the light receiving device 9. The numbers of light receiving devices 9 and preamplifiers 18 are matched to the number of opposing surface light emitting devices 15. The lower surface at the other end of the lower cladding 3 is mounted with the driver 19 adjacent to the opposing surface light emitting device 15 that applies driving current to the surface light emitting device 15. The numbers of surface light emitting devices 15 and drivers 19 are not limited to one, but may be two or more.

The upper surface of the upper cladding 2 and the lower surface of the lower cladding 3 are respectively provided with electrical wiring (not shown). The electrical wiring includes a signal line for transmitting electrical communication signals between a host communication device not shown and the driver 16 and preamplifier 18, a signal line between the driver 16 and the surface light emitting device 5, a signal line between the light receiving device 9 and the preamplifier 18, power lines and ground lines, a signal line for transmitting electrical communication signals between an opposing host communication device not shown and the preamplifier 17 and driver 19, a signal line between the preamplifier 17 and the opposing light receiving device 11, a signal line between the opposing surface light emitting device 15 and the driver 19, opposing power lines and ground lines, etc. Also, the electrical wiring may include a signal line between one end and the other end of the optical transmission assembly 1, power lines and ground lines.

Below is explained operation of the optical transmission assembly 1.

As shown in FIG. 1, a wavelength $\lambda 1$ light signal emitted from the surface light emitting device 5 mounted on the upper surface at one end of the upper cladding 2 is transmitted in the thickness direction of the upper cladding 2, reflected at the reflective surface 6, bent through substantially 90° in its optical path, and transmitted in the core 4 and in the other end (rightward in FIG. 1) direction. The wavelength $\lambda 1$ light signal transmitted in the other end direction in the core 4 is transmitted straight through the wavelength filter 8, and further transmitted in the core 4. At the other end of the optical transmission assembly 1, the wavelength $\lambda 1$ light signal transmitted in the core 4 from one end is transmitted straight through the opposing wavelength filter 14, and further transmitted in the core 4. This wavelength $\lambda 1$ light signal is reflected at the opposing reflective surface 12, transmitted in the thickness direction of the upper cladding 2, and is incident on the opposing light receiving device 11 mounted on the upper surface at the other end of the upper cladding 2.

On the other hand, a wavelength $\lambda 2$ light signal emitted from the opposing surface light emitting device 15 mounted on the lower surface at the other end of the lower cladding 3 is transmitted in the thickness direction of the lower cladding 3, reflected at the opposing wavelength filter 14, and transmitted in the core 4 and in one end (leftward in FIG. 1) direction. At one end of the optical transmission assembly 1, the wavelength $\lambda 2$ light signal transmitted in the core 4 from the other end is reflected at the wavelength filter 8, transmitted in the thickness direction of the lower cladding 3, and is incident on the light receiving device 9 mounted on the lower surface at one end of the lower cladding 3.

In this case, the surface light emitting device 5 is driven by driving current from the driver 16, and the received light current of the light receiving device 9 is amplified by the preamplifier 18. Because the surface light emitting device 5 and the driver 16 are mounted on the upper surface of the upper cladding 2, and the light receiving device 9 and the preamplifier 18 are mounted on the lower surface of the lower cladding 3, electromagnetic noise radiated by the surface light emitting device 5 or the driver 16 is unlikely to affect the light receiving device 9 or the preamplifier 18. Likewise, because the opposing surface light emitting device 15 and the driver 19 are mounted on the lower surface of the lower cladding 3, and the opposing light receiving device 11 and the preamplifier 17 are mounted on the upper surface of the upper cladding 2, electromagnetic noise radiated by the opposing surface light emitting device 15 or the driver 19 is unlikely to affect the opposing light receiving device 11 or the preamplifier 17.

Because conventionally, electromagnetic noise from the driver adversely affects operation of the preamplifier, there is difficulty reducing the distance between the driver and the preamplifier to ensure that the optical transmission assembly is small-sized and integrated, whereas because in the present invention, the driver 16 and the preamplifier 18 are arranged separately on the upper and lower surfaces respectively, the distance between the driver 16 and the preamplifier 18 is long compared to their coplanar arrangement and mounting, thereby reducing effects of electromagnetic noise. The same is true for the driver 19 and the preamplifier 17. Thus, it is possible to reduce the planar distance between the driver and the preamplifier to ensure that the optical transmission assembly is small-sized and integrated, without increasing effects of electromagnetic noise.

Next is explained another embodiment of the invention.

As shown in FIG. 3, an optical transmission assembly 31 includes a connector 32 attached to the other end in a longitudinal direction of the core that may be engaged with another optical transmission assembly connector or tape optical fiber connector.

The construction of the optical transmission assembly 31 may be imaged as if optical transmission assembly 1 explained in FIG. 1 is cut at a longitudinal intermediate position to result in only a one-end side. That is, as shown in FIG. 4, the upper surface at one end of the upper cladding 2 is mounted with surface light emitting device 5 and driver 16 for driving the surface light emitting device 5. Although not shown in FIG. 4, the lower surface of the lower cladding 3 is mounted with light receiving device 9 and preamplifier 18 for amplifying received light signals of the light receiving device 9.

Cross section 33 of the core 4 appears at the other end of the optical transmission assembly 31. The cross section 33 of the core 4 may be considered as input/output port. The optical transmission assembly 31 is constructed by attaching connector 32 to the other end having the input/output port as shown in FIG. 3.

As shown in FIG. 3, the connector 32 has a slot, which may be attached to the other end of the optical transmission assembly 31, and a connector engagement slot (or protrusion), which may be engaged with an opposing connector not shown. In contrast, the opposing connector has a connector engagement protrusion (or slot), which may be engaged with the connector 32, and a slot, into which a tape optical fiber or an opposing optical transmission assembly both not shown may be inserted.

The tape optical fiber comprises plural parallel-arranged optical fibers whose cladding diameter is the same as the upper/lower cladding thickness of the optical transmission assembly 31. Because the core width direction alignment pitch of the plural cores 4 in the optical transmission assembly 31 is the same as the optical fiber alignment pitch in the tape optical fiber, the tape optical fiber cores can be optically coupled to cores 4 respectively. The tape optical fiber is attached with a tape optical fiber connector at one end, which may be engaged with the connector 32 of the optical transmission assembly 31, and a tape optical fiber connector at the other end as well.

In the opposing optical transmission assembly not shown, complimentarily to the optical transmission assembly 31 of FIGS. 3 and 4, the upper surface at the other end of the upper cladding is mounted with a light receiving device, while the lower surface at the other end of the lower cladding is mounted with a surface light emitting device, the opposing optical transmission assembly corresponding to the other-end side resulting from cutting optical transmission assembly 1 of FIG. 1 at a longitudinal intermediate position. In this manner, connecting the optical transmission assembly 31 and the opposing optical transmission assembly via the tape optical fiber allows bidirectional transmission, similarly to the case of use of optical transmission assembly 1 of FIG. 1. The optical transmission assembly 31 and the opposing optical transmission assembly may be connected, not via the tape optical fiber, but by a connector.

According to the optical transmission assembly 31, because the driver 16 and the preamplifier 18 are arranged separately on the upper surface of the upper cladding 2 and lower surface of the lower cladding 3 respectively, it is possible to reduce electromagnetic noise between transmission and reception.

According to the optical transmission assembly 31, because combining it with the opposing optical transmission assembly allows construction equivalent to inserting the tape optical fiber at an intermediate position of optical transmission assembly 1 of FIG. 1, it is possible to adjust the length of the tape optical fiber and thereby freely set the transmission distance.

Optical transmission assembly 1 or 31 of the invention is installed between a host communication device and another communication device, thereby allowing optical transmission of communication signals between both the communication devices. Also, optical transmission assembly 1 or 31 of the invention is installed in an electronic device, thereby allowing optical transmission of communication signals between an electronic circuit and another electronic circuit. For example, one electronic circuit substrate is mounted with optical transmission assembly 31, while the other electronic circuit substrate is mounted with an opposing optical transmission assembly, connecting the optical transmission assembly 31 and the opposing optical transmission assembly via a tape optical fiber. This allows optical transmission between the electronic circuit substrates.

Also, optical transmission assembly 1 or 31 may be provided with electrical wiring extending in the longitudinal direction of the cores, constructing electrical transmission lines parallel with optical transmission lines of the cores. The electrical wiring may be used in slow signal transmission or power supply, while the optical transmission lines may be used in fast signal transmission.

Also, both or either of the upper surface of the upper cladding 2 and lower surface of the lower cladding 3 of optical transmission assembly 1 or 31 may be provided with an electromagnetic shield sheet (metallic film), thereby allowing a more reduction in electromagnetic noise.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical transmission assembly, comprising:
   a single optical waveguide plate comprising an upper cladding, a lower cladding, and a core formed between the upper cladding and the lower cladding, an inverted V-shape groove being formed in a lower surface of the lower cladding and the core;
   a surface light emitting device mounted to an upper surface at one end of the upper cladding, a light emitting surface of the surface light emitting device facing the core and emitting wavelength $\lambda 1$ light thereto;
   a driver mounted on the upper surface at the one end of the upper cladding, the driver driving the surface light emitting device;
   a reflective surface formed in the core and at a position facing the light emitting surface of the surface light emitting device, and inclined in a longitudinal direction of the core, wherein an inclined surface of the inverted V-shape groove faces the reflective surface in a longitudinal direction of the core, and is inclined in a height direction of the upper or lower cladding;
   a wavelength filter formed on the inclined surface, said wavelength filter being confined within the inverted V-shape groove and transmitting wavelength $\lambda 1$ light incident in a longitudinal direction of the core while reflecting wavelength $\lambda 2$ ($\lambda 2 \neq \lambda 1$) light incident in an opposite longitudinal direction of the core to an incident direction of the wavelength $\lambda 1$ light, in a height direction of the lower cladding;

a light receiving device mounted on a lower surface of the lower cladding and facing the wavelength filter, and a preamplifier mounted on the lower surface of the lower cladding, the preamplifier amplifying a received light current of the light receiving device.

2. The optical transmission assembly according to claim 1, further comprising:

an opposing light receiving device mounted on an upper surface at an other end of the upper cladding in the longitudinal direction of the core;

an opposing preamplifier mounted on the upper surface at the other end of the upper cladding, the opposing preamplifier amplifying a received light current of the opposing light receiving device;

an opposing reflective surface formed in the core and at a position facing the opposing light receiving device, and inclined in a longitudinal direction of the core;

an opposing inclined surface fanned in the core and facing the opposing reflective surface in a longitudinal direction of the core, and inclined in a height direction of the upper or lower cladding;

an opposing wavelength filter formed on the opposing inclined surface and transmitting wavelength $\lambda 1$ light incident in the longitudinal direction of the core while reflecting wavelength $\lambda 2$ light incident in a height direction of the lower cladding, in the longitudinal direction of the core;

an opposing surface light emitting device mounted on a lower surface of the lower cladding, a light emitting surface of the opposing surface light emitting device facing the opposing wavelength filter, and an opposing driver mounted on the lower surface of the lower cladding, the opposing driver driving the opposing surface light emitting device.

3. The optical transmission assembly according to claim 1, further comprising:

electrical wiring formed on at least one of the upper surface of the upper cladding and the lower surface of the lower cladding.

4. The optical transmission assembly according to claim 1, further comprising:

a connector attached to an other end of the upper cladding in the longitudinal direction of the core, the connector being engaged with another optical transmission assembly connector or tape optical fiber connector.

* * * * *